United States Patent [19]

Steiner et al.

[11] Patent Number: 5,268,996
[45] Date of Patent: Dec. 7, 1993

[54] COMPUTER IMAGE GENERATION METHOD FOR DETERMINATION OF TOTAL PIXEL ILLUMINATION DUE TO PLURAL LIGHT SOURCES

[75] Inventors: Walter R. Steiner, Ormond Beach; William A. Kelly, West Port Orange; Robert J. Caesar, Jr., Daytona Beach; Gregory C. Buchner, South Daytona; Michael L. Morgan, Ormond Beach, all of Fla.

[73] Assignee: General Electric Company, Philadelphia, Pa.

[21] Appl. No.: 631,254

[22] Filed: Dec. 20, 1990

[51] Int. Cl.5 .................................. G06F 15/66
[52] U.S. Cl. .................................. 395/126
[58] Field of Search .............. 395/121, 122, 123, 126, 395/127, 129, 130

[56] References Cited

U.S. PATENT DOCUMENTS

| | | | |
|---|---|---|---|
| 4,348,184 | 9/1982 | Moore | 395/126 |
| 4,709,231 | 11/1987 | Sakaibara et al. | 395/126 |
| 4,819,192 | 4/1989 | Kuragano et al. | 395/127 |
| 4,928,250 | 5/1990 | Greenberg et al. | 395/126 |
| 4,943,938 | 7/1990 | Aoshima et al. | 395/126 |

OTHER PUBLICATIONS

"Principles of Interactive Computer Graphics" by William M. Newman, 2nd Edition, 1979. pp. 390, 391, 392, 393, 934.

"Fundamentals of Interactive Computer Graphics". J. D. Foley and A. Van Dam, Jul. 1984, pp. 550–551, 575–590.

Primary Examiner—Gary V. Harkcom
Assistant Examiner—Huynh Ba
Attorney, Agent, or Firm—Geoffrey H. Krauss

[57] ABSTRACT

A method for determining the illumination of an illuminator at a selected point P in an image volume to be projected on an image screen surface by a computerized image generator, operates by: decomposing the illuminator into at least one of spherical, beam and cylindrical sources; determining a direction of incidence of the light from each source at point P in the image volume; determining the extent of the source and the attenuation of illumination with distance from that source; then determining a set of color light intensities at point P in the image volume due to the light from the particular source; and translating the incidence direction and color intensities from point P to a displayable incidence direction and a displayable set of color illumination intensities at a corresponding projection location on the image screen surface.

20 Claims, 6 Drawing Sheets

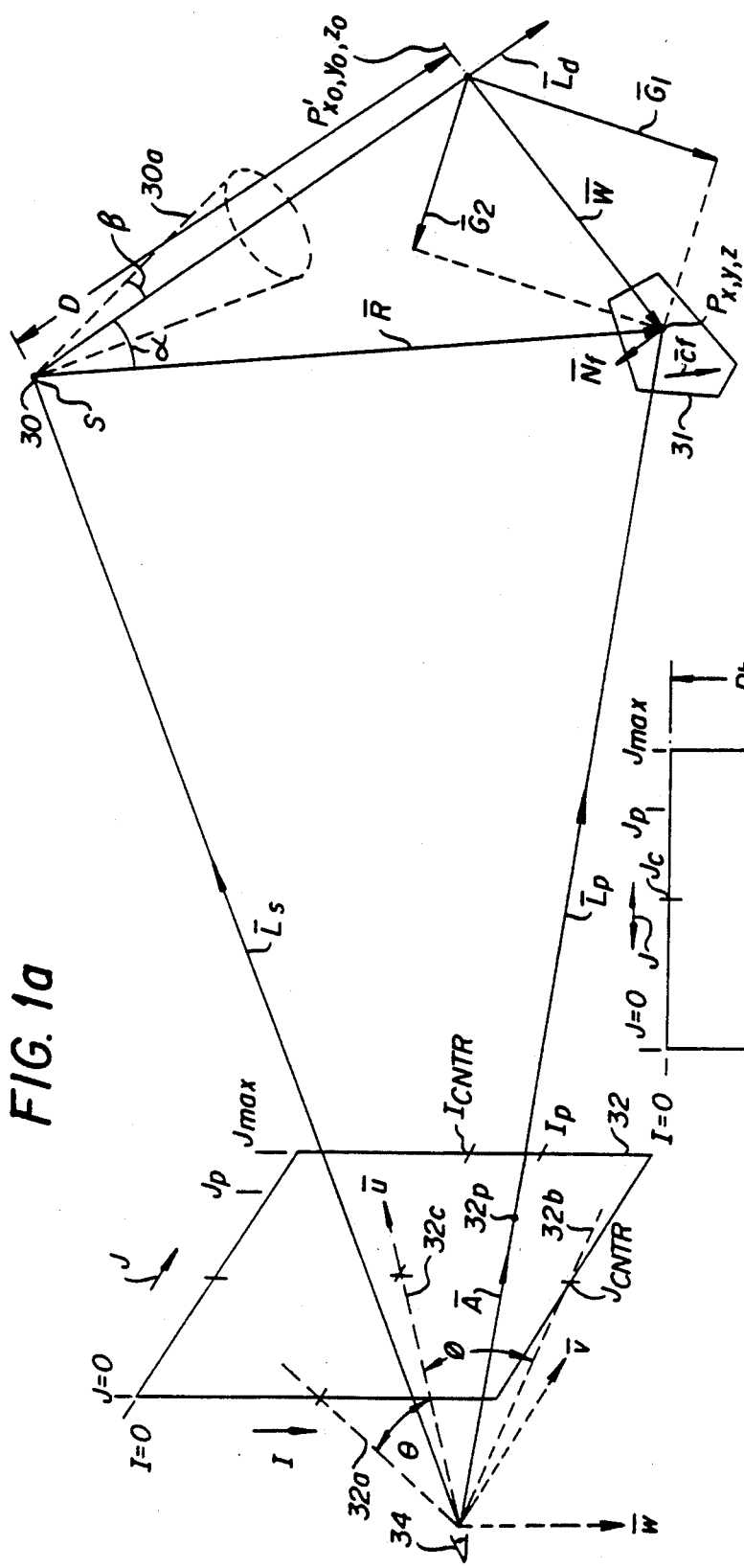
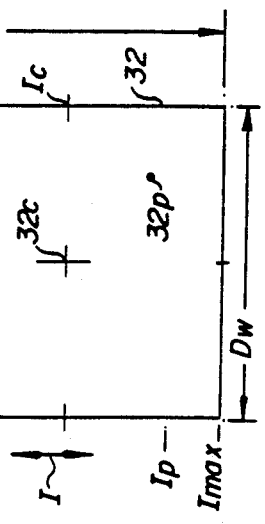
FIG. 1a
FIG. 1b

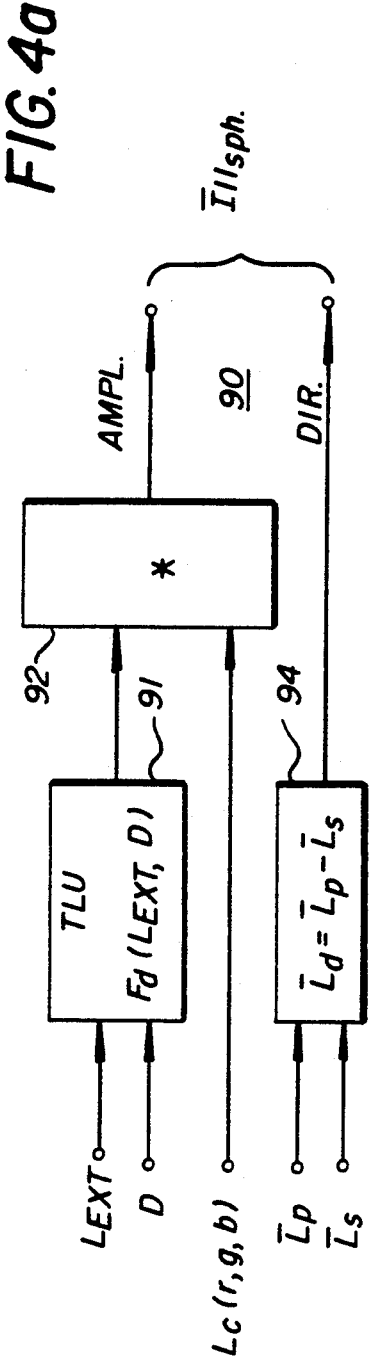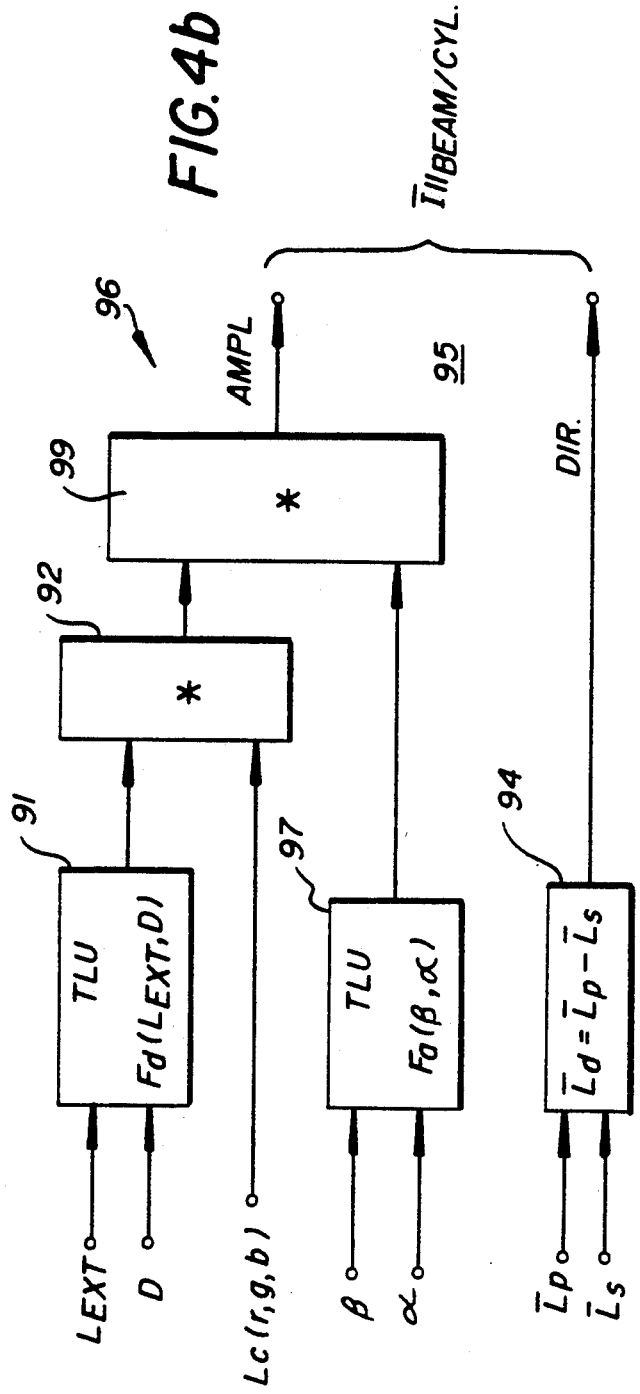

COMPUTER IMAGE GENERATION METHOD FOR DETERMINATION OF TOTAL PIXEL ILLUMINATION DUE TO PLURAL LIGHT SOURCES

FIELD OF THE INVENTION

This invention relates to computer image generation (CIG) systems and, more particularly, to novel methods for simulating illumination of surface and/or dispersions by light sources, typically of artificial nature, for use in imaging systems.

BACKGROUND OF THE INVENTION

Real-time computer image generation systems are being more frequently used to generate realistic images for a variety of simulation system, such as battle-tank, flight and the like simulators which are utilized as training devices which permit an individual to obtain practice in a particular environment (i.e. combat) without the necessity of going into the actual environment and utilizing the actual (combat) system. The user is enable to acquire, maintain and improve associated skills without the expense normally associated with live training. It is therefore extremely advantageous to provide the user with a video display having a high degree of realism so as to be most beneficial for training and practice purposes.

It is now well known to utilize polygons to approximate real object contours in computer image generation. The most realistic simulations require highly accurate methods for simulating the illumination effect of light sources on these polygons; illumination effect simulation methods are well known in the CIG arts. These methods, which are often very computationally intense (to the point of being prohibitively expensive) typically must be used for each point to be displayed, with the computation being repeated for each and every light source. Many CIG systems thus require restriction on the number of light sources which can be utilized, to allow computations to be completed for all points within a field, in the time available (e.g. 16.67 mSec, for a 60 field interlaced raster scan).

The methods utilized to simulate light source illumination effects cover at least five separate areas: simulation of the light source itself; simulation of source light reflected from a surface; simulation of light source reflections from a surface shape due to shading; simulation of source light reflected by atmosphere particles; and simulation of source light due to intervening surfaces between each source and the point presently in consideration. It will be seen that data obtained by simulation of each light source in one category is utilized in each of the subsequent simulation areas, so that simplification of light source illumination computations in one area may effectively reduce computational needs in other areas of real-time computer image generation.

Light sources can generally be simulated by one, or a combination, of only three source types: a point source, such as a flare and the like, would be located at a definite light source position, and emits a sphere of light with the light intensity of each of the radially-emitted directional rays being attenuated with distance from the source position; a beam of light is simulated by narrowing the emission angle so that the emitted rays thereof form a light cone directed away from the light source position in a known direction, and with the rays also having an intensity attenuated with distance from the source position (this source approximates landing lights and the like); or, by setting the spreading angle of the light cone essentially to zero, a cylinder of light can be provided for simulating very narrow light beams (e.g. from a searchlight, a laser and the like), in which the emission position is broadened to a line, of extent equalled to the cylinder diameter (instead of the point source emitter utilized with a sphere or beam of light), but with the substantially parallel light rays in the cylinder still being attenuated with distance from the light position.

It is therefore highly desirable to provide simplified methods for representing the amplitude and direction of light illuminating a particular point, upon a surface under consideration, during computer image generation in a system of any desired degree of complexity.

BRIEF SUMMARY OF THE INVENTION

In accordance with the invention, a method for determining the illumination of a light source illuminator at a selected point P in an image volume to be projected on an image screen surface by a computerized image generator, comprises the steps of: decomposing the source into at least one of spherical, beam and cylindrical sources; determining a direction of incidence of the light from each source at point P in the image volume; determining the extent of the source and the attenuation of illumination with distance from that source; then determining a set of color light intensities at point P in the image volume due to the light from the particular source; and translating the incidence direction and color intensities from point P to a displayable incidence direction and a displayable set of color illumination intensities at a corresponding projection location on the image screen surface.

In one presently preferred embodiment, highly accurate beam illumination simulation is provided by use of an orthogonal gradient beam lobe light model. In other preferred embodiments, simplified models have the light source extent (distance attenuation) factor stored in at least one look-up table, with look-up tables also being used to obtain angular functions of beam-derived (beam and cylinder) contributions off the axis of the beam direction.

Accordingly, it is an object of the present invention to provide novel methods for simulating the illumination provided by light sources utilized in computer image generation.

This and other objects of the present invention will become apparent upon reading the following detailed description, when considered in conjunction with the associated drawings.

BRIEF DESCRIPTION OF THE DRAWINGS

FIG. 1a is a schematic vector diagram illustrating the relationship between the observer, the image volume in which the simulated light source illuminates a simulated object polygon, and the image screen upon which projection of the image volume is viewable by the observer;

FIG. 1b is a plan view of the image screen of FIG. 1a;

FIG. 3, comprising FIGS. 4a-4b are schematic block diagrams of one possible form of TLU subprocessor for use in image generators.

DETAILED DESCRIPTION OF THE INVENTION

Figure 1:
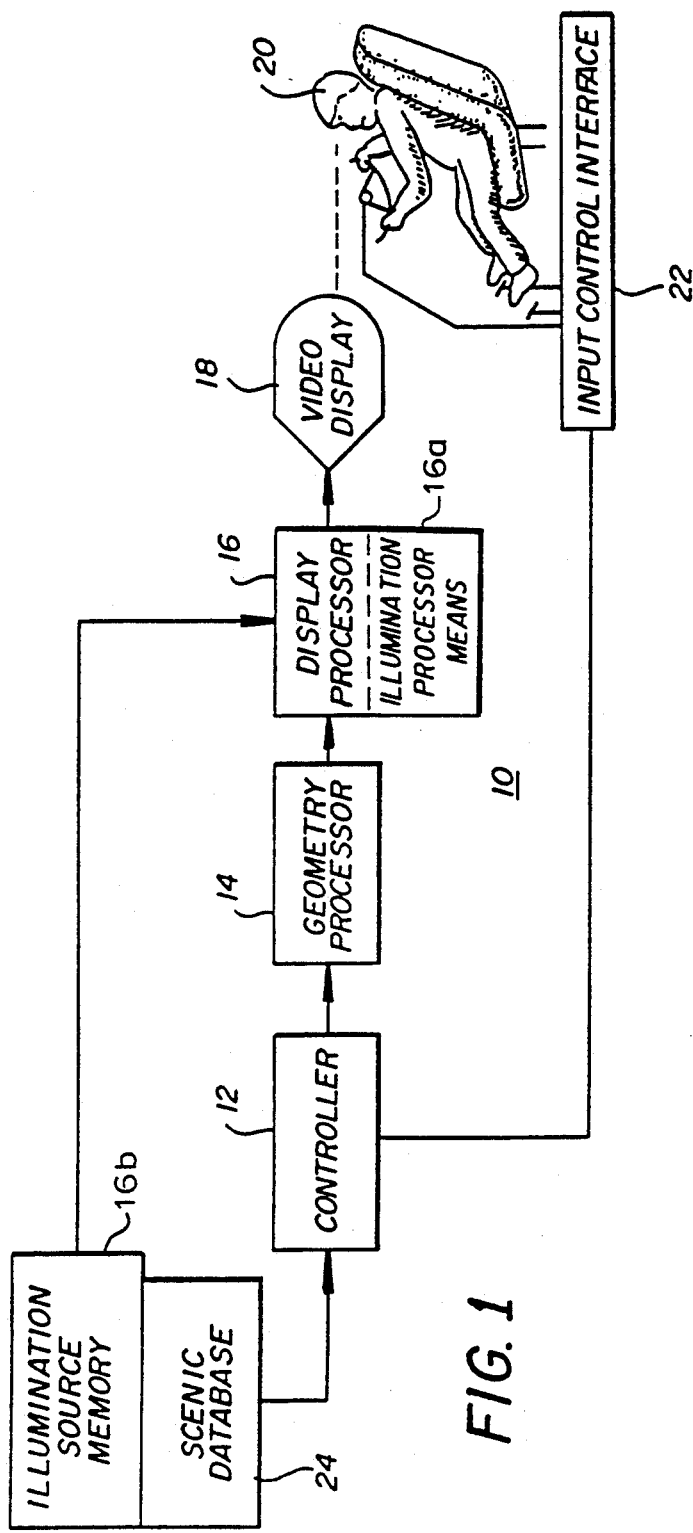
FIG. 1 is a simplified block diagram of a real-time computer image generation (CIG) system, in which the methods of the present invention may be practiced.

While our novel methods can be used with a wide range of computer image generators (including something as simple as a video game), we refer initially to FIG. 1, wherein a typical real-time CIG system 10, e.g. a flight simulator system and the like, generates a viewable image by the action of several separate processing stages or sections, each working independently upon data representative of, or corresponding to, one of three consecutive scenes to be displayed. A controller section 12 processes scene/image data for a fixed time interval, which is usually a field time interval (e.g. 1/60-th second for a typical NTSC television display format, with two interlaced fields per frame and 30 frames per second), although the time interval (e.g. 1/30-th) for a full frame (comprised of a pair of interlaced fields) may be utilized. The controller-processed data is transferred to a geometry processor stage 14 which has a similar (field or frame) time interval to perform its calculations and send the results of those calculations to a display processor 16. The display processor also processes one interlaced field, in one field time interval, for transfer to a video display means 18, to provide a scenic display viewable by a system user 20. Thus, for each frame time interval, all three processors 12/14/16 are busy, with each processor, at any given time, working upon a different one of three separate (but sequential) scenes. Each section or stage processes inputs and generates outputs during each time interval and causes data to flow through the three stages in sequential manner. Thus, the computational load is spread over several specialized processor sections, and allows new scenic information to be displayed in each field or frame time interval, even though the resulting displays are delayed by three fields or frames.

More specifically, in a flight simulator system, the user pilot 20 moves control apparatus (joystick, rudder pedals, etc.) which are part of an input control interface means 22. The data seen on display 18 by the pilot results in simple control inputs being applied to an environment definition and used in controller means 12 to calculate a new position and orientation for the aircraft. Within controller means 12, a mathematical transformation is calculated from the new aircraft position and orientation; the transformation is used to rotate and translate objects from a reference coordinate system to a display coordinate system. The controller also calculates any other information dealing with the aircraft and with the position of other aircraft, objects, targets and the like, which would be viewable in a particular scene.

Geometry processor 14 reads descriptions of potentially visible objects and surfaces from a scenic data base 24 and stores the object information in a three-dimensional digital representation of the scene. The objects read out from data base 24 translated into display coordinates utilizing the rotation matrix calculated in controller 12. The geometry processor clips away any part of a three-dimensional object if that object extends beyond the boundaries of a view window, and then mathematically projects the three-dimensional object data onto a two-dimensional display window. The geometry processor also clips out object portions which extend beyond the two-dimensional image plane display window boundaries. Each processed object is comprised of individual polygons. Geometry processor 14 finally calculates the end points and coefficients of the line equations describing the bounding edges of the two-dimensional polygons and passes this information to display processor means 16.

Display processor 16 receives two-dimensional face descriptions, along with other information, such as face color, face fading, cell texturing, level-of-detail blending, translucency, curvature shading, and the like information, and uses this information to output video information of the present scene to the color display 18. Each color display image is typically made up of 1024 lines of video information, with each line having 1024 individual color dots, or pixels (picture elements). While other combinations of lines and pixels per line are possible, whatever display parameters are utilized, display processor must, for each pixel, resolve pixel color, given that contributions from many polygons can be present in a pixel, and that certain portions of any polygon may be covered by other polygons. Since there can be over one million pixels in a display, and though this information needs to be calculated in 1/60-th second, it will be seen that the processing load on display processor 12 is extremely high. Even though a display processor 16 may have to perform in excess of 10 billion computations per second, there is typically within display processor 16 only a single illumination processor means 16a, utilized to determine the luminance intensity of each pixel, based upon information as to the sources illuminating that pixel, as provided by an illumination sources memory 16b. Further information concerning the operation of system 10, and of each of means 12, 14, 16 and 16a may be had by reference to U.S. Pat. Nos. 4,727,365 (issued Feb. 23, 1988), 4,825,391 (issued Apr. 25, 1989) and 4,811,245 (issued Mar. 7, 1989), all assigned to the assignee of the present invention and incorporated herein in their entireties by reference. The display processor 16 therefore represents a majority of processing operations in a real-time computer image generation system, and thus much effort is concentrated in the display processor area in any attempt to improve the capability and realism of a CIG system.

One particular area in which increased realism can be obtained is in the simulation of the effect of illumination from a source 30 (FIG. 1a) upon a particular point $P_{x,y,z}$ of an object polygon 31, where the source 30 and/or polygon 31 are projected as illuminated pixels on a planar image screen 32, as viewed by an observer 34 on the opposite side of screen 32 from the image volume containing source 30 and surface polygon 31.

The illumination of interest arrives at polygon point P along a vector $\overline{R}$ directed from the source 30 to the polygon 31. Vector $\overline{R} = \overline{L}_p - \overline{L}_s$, where vector $\overline{L}_s$ is a vector from observer 34 to source position 30, and vector $\overline{L}_p$ is a vector from observer 34 to point P; both vectors $\overline{L}_s$ and $\overline{L}_p$ are known. The major problem is obtaining the amplitude of the illumination intensity (or of the various differently colored contributions, if the source color is separated into chromatic constituents, as would be done to display the image in NTSC video format, i.e. with red (r), green (g) and blue (b) components each independently being provided by a separate source in the display means 18). If a beam front point 30 is broadly considered to be shaped as a cone 30a with a centerline, or boresight, vector $\overline{L}_d$ which happens to lie along vector $\overline{R}$, there would be direct illumination of point P; if the boresight vector $\overline{L}_d$ is offset from vector $\overline{R}$ by some angle $\beta$ which is not greater than the cone half-angle $\alpha/2$, a ray in the cone still directly illuminates point P and the light intensity I is known from the beam characteristics; if the offset angle $\beta$ is greater than beam half-angle $\alpha/2$, then point P is not illuminated.

We, therefore, want to find the intensity $I_p$ of the light at the point P, on polygon 31, due to a source 30 positioned at a point S defined by a source vector $\overline{L}_s$ originating at an observer 34. The intensity $I_p$ is determined as a function of two factors: the angle $\beta$, between the beam boresight vector $\overline{L}_d$ and the source-to-point vector $\overline{R}$; and the range (i.e. $|\overline{R}|$) between the source 30 and the point P. We note that the triangle S, P', P is characterized by sides W, D and R, as well as by angle $\beta$ and its supplementary angle (S-P-P'), because angle S-P'-P is a right-angle. If $I_p$ is found as a function of distance D and of angle $\beta$, then a set of equations can be provided to allow the value of intensity $I_p$ to be found from W and D calculated to any point P on polygon 31 when the observer 34 is looking through a pixel 32p at a location (I,J) on screen 32 and along the line between observer and point P. Screen location I may correspond to the location of the present line in a raster scan having a plurality of such scan lines, and screen location J may correspond to the location of a particular pixel along the raster scan line I; thus, a pixel 32p at a location (I,J) may be the J-th element from the left (zero) edge pixel of the I-th scan line down in a video display raster. The display screen 32 is also described by a right-handed coordinate system with: a unit vector $\overline{U}$ normal to screen 32 and extending from viewpoint 34; a unit $\overline{V}$ vector parallel to the display 32 plane and to a raster line I therein; and a unit $\overline{W}$ vector parallel to the display 32 plane and normal to the raster lines I. All vectors are transformed into the screen (uvw) coordinate system.

Referring to both FIGS. 1a and 1b, display screen 32 has a maximum of $I_{max}$ lines scannable in the vertical direction, each having a maximum of different $J_{max}$ elements to which a display beam $L_p$ can be directed. With respect to display center line 32c, a horizontal angle $\theta$ is definable between the center line and a furthest horizontal extent (e.g., a line 32a to the left edge, assuming equal angles to left and right edges). Similarly, a vertical angle $\phi$ is definable between center line 32c and a fullest vertical extent (e.g., a line 32b to the bottom edge, assuming equal angles to top and bottom edges). Thus, a total horizontal field-of-view angle of $2\theta$ is provided, while the total vertical field-of-view angle is $2\phi$. Because we desire a display with substantially equally spaced scan lines and elements along each line, the display width $D_w$ is, given a unit distance between viewpoint 34 and screen 32 (i.e. $|\overline{U}|=1.00$), $D_w=2\tan\theta$, and the distance $C_v$ between elements, in the V axis direction, is $C_v=D_w/J_{max}=2\tan\theta/J_{max}$. The display height $D_h=2\tan\phi$ and the distance $C_w$ between lines, in the W axis direction, is $C_w=D_h/I_{max}=2\tan\phi/I_{max}$. The display point 32p has screen coordinates $(I_p,J_p)$, where the point line number $I_p$ and line pixel number $J_p$ are both dependent upon the orientation of the screen $\overline{U}$, $\overline{V}$ and $\overline{W}$ vectors in "normal" space (i.e. the volume with axis vectors $\overline{X}$, $\overline{Y}$ and $\overline{Z}$); thus, we must store screen unit vector data for $\overline{U}=U_x\overline{x}+U_y\overline{y}+U_z\overline{z}$, $\overline{V}=V_x\overline{x}+V_y\overline{y}+V_z\overline{z}$ and $\overline{W}=W_x\overline{x}+W_y\overline{y}+W_z\overline{z}$, as well as the screen constants $C_v$ and $C_w$. In addition, if $\theta_l$ (the angle between the left edge and the center line) is not equal to $\theta_r$ (the angle between the right edge and the center line) then an offset constant $J_o$ must be stored:

$$J_o = J_{max}(\tan\theta_l/(\tan\theta_l+\tan\theta_r))$$

and, if $\phi_t$ (the angle between the top edge and the center line) is not equal to $\phi_b$ (the angle between the bottom edge and the center line), then another offset constant $I_o$ must also be stored:

$$I_o = I_{max}(\tan\phi_t/(\tan\phi_t+\tan\phi_b)).$$

Once we have obtained and stored all of these constants, we can mathematical model the light source 30 by defining $$\overline{L}_s = (L_{s1}\overline{u}, L_{s2}\overline{v}, L_{s3}\overline{w}) \quad (1)$$

and $$\overline{L}_d = (L_{d1}\overline{u}, L_{d2}\overline{v}, L_{d3}\overline{w}) \quad (2)$$

as the respective light source and direction vectors.

We now define a pair of beam cone gradient vectors $\overline{G}_1$ and $\overline{G}_2$, each normal to the other and to the boresight vector $\overline{L}_d$ and expressed in screen coordinates as $$\overline{G1} = (C_{11}\overline{u}, C_{12}\overline{v}, C_{13}\overline{w}) \quad (3)$$

and $$\overline{G2} = (C_{21}\overline{u}, C_{22}\overline{v}, C_{23}\overline{w}) \quad (4)$$

For a conical light beam 30a, the intensity attenuates as a function of R (or D) and W; attenuation curves can be calculated, or empirically derived, for varying distance and offset range W, in various cases of atmosphere haziness. These curves can be stored in one, or more, look-up data tables (TLU). In general, in a conical beam, the attenuation function varies as $W/DK_c$ (where $K_c$ is a constant) or, more simply, as $(W/D)$. Thus, the amplitude of gradients $\overline{G}_1$ and $\overline{G}_2$ decrease as distance D increases, so that the beam cone 30a increases in diameter; scaling the gradients changes the beamwidth angle $\alpha$. Therefore, illumination intensity $Ill_R$ along vector $\overline{R}$ is a function of the range attenuation curve, and intensity $Ill_w$ along vector $\overline{W}$ is a function of W and D; thus, $Ill_R=F_r(R)$, with $F_r(R)$ being the light attenuation as a function of distance, and $Ill_w=F_w(W/D)$, with $F_w$ being the light attenuation as a function of angle $\beta$.

For a sphere-shaped light source, only the $Ill_R$ intensity need be found. To allow the same apparatus to be used for all source types, an arbitrary light source direction $\overline{L}_d$ and gradients can be defined for the spherical source, so that the $\overline{W}$ vector is still used to find R and, subsequently, $Ill_R$.

It will be appreciated that most normally-encountered sources have a beam half-angle less than one radian. However, referring now to FIG. 2a, one source (such as a flare and the like) with a beam angle larger than one radian is a point source 30-1 with a spherical illumination envelope 30a-1. At the source point S, distance D is equal to zero and $Ill_w$ would go to infinity; the $\overline{L}_{sph}$ ray vectors essentially have all possible orientations, so that the ray impingent upon point P travels directly along the direction vector $\overline{L}_d$. Thus, the incident illumination direction is along unit vector $1_{\overline{L}_d}$ and the intensity varies with R, where $R = |\overline{L}_d| = |\overline{L}_p - \overline{L}_s|$.

Because a color display 18 will need intensity information with respect to color components of the source light, three separate calculations may be required, for $L_{source}$ (red), (green) and (blue) components.

The spherical source calculations are:

$$Ill_{SPH}=(L_c(r,g,b)*F_r(R)*LOD*F_{shd}) \qquad (5)$$

where $L_c$ (r,g,b) is that one of the red, green and blue source color luminances being considered, LOD is a Level-of-Detail function and $F_{shd}$ is a shading function for that polygon (i.e. the angle at which the polygon faces the source).

Figure 2A:
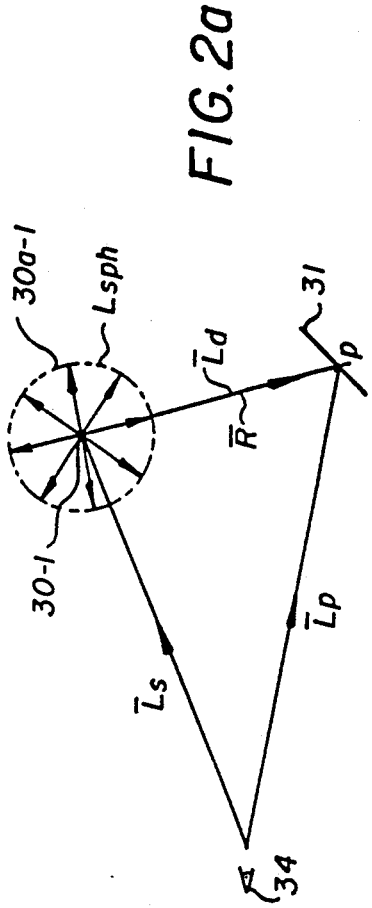
FIGS. 2a–2d are respective views of light sources of the spherical, beam, cylinder and fog forms, and useful in appreciating the methods of the present invention.
Figure 2B:
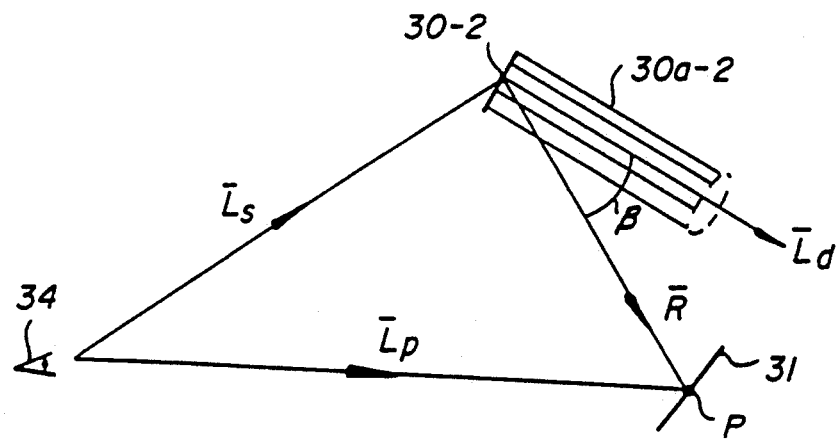

Referring now to FIG. 2b, on the opposite end of the beam angle scale, $\alpha=0$ for a light cylinder source 30-2 with essentially parallel rays 30a-2. The cylindrical beam (which can be provided by a laser, certain types of searchlights, and the like) has a boresight axis vector $\overline{L}_d$ and an attenuation function which is a constant with respect to the boresight. The same calculations can be used to find W and R, but, here, the quotient $W/K_d$ is used to determine the diameter of the cylinder. The source calculations can be simplified by noting that this case is somewhat similar to that of the point source, but with an added factor $F_w$ needed to account for the separation angle $\beta$ between vectors $\overline{L}_d$ and $\overline{R}$:

$$Ill_{cyl}=L_c(r,g,b)*F_r(R)*F_w(W/K_d)*LOD*F_{shd}. \qquad (6)$$

Figure 2C:
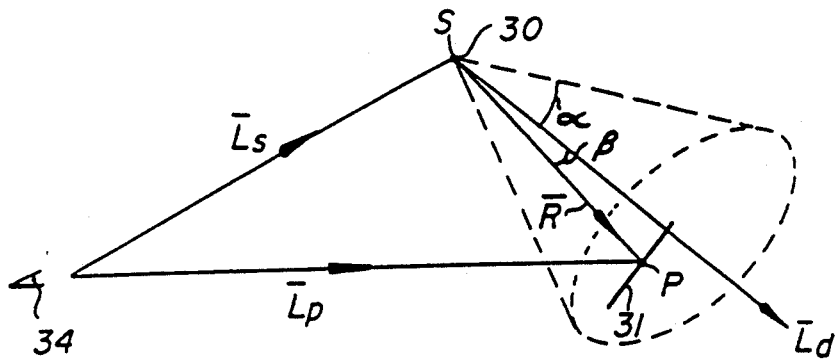

Referring to FIG. 2c, this formula can be easily expanded to also include the conical beam:

$$Ill_{beam}=L_c(r,g,b)*F_r(R)*F_w(W/D)*LOD*F_{shd}. \qquad (7)$$

where the $F_w$ TLU activity is governed by two input variables ($\alpha$ and $\beta$) rather than the one variable ($\beta$) for the cylinder beam. It will be understood that equation (6) is a special case of equation (7) with $D=K_d$.

Thus, use of two TLU operations will facilitate simple calculation of illumination intensity for the three basic forms (sphere, beam and cylinder) of artificial illumination sources.

Distance D can now be found as $$D=P_u[L_v*J+L_w*I+L_u]-L_0 \qquad (9)$$

where $L_v=L_d\overline{v}*c_v$, $L_w=L_d\overline{w}*c_w$, $L_u=L_d\overline{u}$ and $L_0=\overline{L}_d\cdot\overline{L}_s$. The distance $|W|$ is found from $$W=(|\overline{G}_1|^2+|\overline{G}_2|^2)^{\frac{1}{2}} \qquad (10)$$

where gradient $\overline{G}_1$ and $\overline{G}_2$ are now written as $$\overline{G}_1=P_u[I_{11}\overline{v}*J+I_{12}\overline{w}*I+I_{13}\overline{u}]-I_{10} \qquad (3a)$$

with $I_{11}\overline{v}=C_{11}\overline{v}*C_v*\alpha$, $I_{12}\overline{w}=C_{12}\overline{w}*C_w*\alpha$, $I_{13}\overline{u}=C_{13}\overline{u}*\alpha$ and $I_{10}=\overline{G}_1\cdot\overline{L}_s*\alpha$, and $\overline{G}_2=P_u[I_{21}\overline{v}*J+I_{22}\overline{w}*I+I_{23}\overline{u}]-I_{20} \qquad (4a)$ with $I_{21}\overline{v}=C_{21}\overline{v}*C_v*\alpha$, $I_{22}\overline{w}=c_{22}\overline{w}*C_w*\alpha$, $I_{23}\overline{u}=C_{23}\overline{u}*\alpha$ and $I_{20}=\overline{G}_2\cdot\overline{L}_s*\alpha$.

Figure 2D:
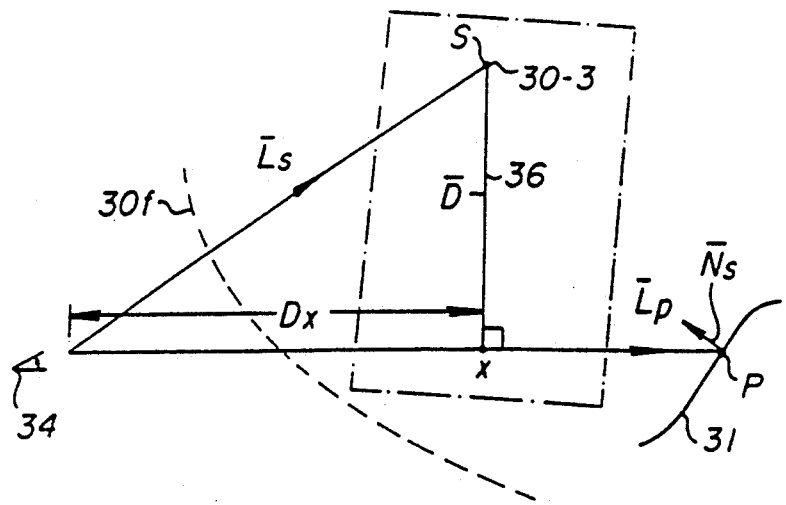

From the W and D distances, $R=(D^2+W^2)^{\frac{1}{2}}$. The shading term $F_{shd}$ can be found from $$\overline{F}_{shd}=R\cdot\overline{N}_f/|\overline{R}| \qquad (11)$$

where $\overline{N}_f$ is a vector normal to the polygon (see FIG. 2d). If the shading is not greater than zero, then we set $F_{shd}$ equal to the translucency of the polygon, with a translucency of zero for complete opaqueness and a translucency of one for complete transparency. The LOD term, which determines if the source is too far away to see and operates to smoothly fade illumination to zero as the light lobe size is decreased (so as to avoid scintillation) is a function of (light size/distance to source S); the LOD factor is clamped at a maximum of 1. Thus, the $F_r(R)$, $F_w(W/D)$, LOD and $F_{shd}$ factors are numbers varying between 0 and 1, while the light intensity varies between 0 and 2 to darken or brighten the illumination.

Referring now to FIG. 2d, a special illumination effect of the spherical radiator is the fog sphere 30f, where light is reflected from (water) particles in the atmosphere. Illumination of fog is usually considered a significant problem, because fog is three-dimensional in nature. The calculations to implement this form of fog simulation have hitherto been very cost prohibitive. We have found that a more cost-effective simulation can be more simply calculated by using a plane 36 which is perpendicular to vector $\overline{L}_s$ and which establishes a point X somewhere between observer 34 and point P; as far as the observer is concerned, the illumination at point X is the illumination at point P, which is obscured by the fog. The illumination at each point on plane 36 is determined in the same manner as for illumination on a polygon. The usual point P component $P_u$ is replaced with a component $P_u'$ calculated from constants C4–C6 defining $\overline{L}_p$ perpendicular to plane 36:

$$C_4=L_p\overline{u}/\overline{L}_s\cdot\overline{L}_s \qquad (8a)$$

$$C_5=C_w*L_s\overline{w}/\overline{L}_s\cdot\overline{L}_s \qquad (8b)$$

$$C_6=C_v*L_s\overline{v}/\overline{L}_s\cdot\overline{L}_s \qquad (8c)$$

The distance D is now easily calculated and the equivalent illumination at point X (as a replacement for point P, now occluded thereby) is a function of fog density and distance $D_x$. Thus, as fog density increases, illumination intensity will increase as more water particles are present to reflect source light; as distance D increases, intensity decreases as fog density occults reflected light from point P. Thus, we can calculate $Ill_{fog}$ as $$Ill_{fog}=[L_c\ (r,g,b)*F_{og}*C]/[F_d\ (\text{eye to }X)] \qquad (12)$$

where $F_{og}$ is a density function (TLU may be used) related to number of particles (water, sand, etc.) in atmospheric suspension, and C is a color absorption factor (may be set equal to a constant) for the type of "fog" particles present. It will be understood that "fog" here refers to any atmospheric particle suspension, and may include snow/ice, sand, smoke and the like.

We prefer, however, to find the fog illumination (i.e. reflection from fog particles due to source S) for each view screen pixel I, J by using the simplification that each source has a sphere-shaped light lobe and finding an unknown point X. As previously stated, we find plane 36, perpendicular to $\overline{L}_s$, with a $\overline{u}$ axial component $P_u=C_4+C_5I+C_6J$. The shading term is replaced by the fog term Fo, while D, W and R are calculated as above. Thus $$Ill_{fog} = L_c(r,g,b) * F_r(R) * LOD * Fo \quad (12a)$$

and $Fo = F_{og}/D_x$.

A polygon illumination $Ill_p$ and/or a fog illumination $Ill_f$ can thus be found at each pixel I, J for each source S. If more than one light source S is present, $Ill_p$ and $Ill_f$ can be found for each source and the total summed separately for direct ($\Sigma Ill_p$) and fog-indirect ($\Sigma Ill_f$) cases. We presently prefer to clamp both totals $\Sigma Ill_p$ and $\Sigma Ill_f$ at a maximum value of 2. Thereafter, we combine these quantities with polygon color $P_c(r,g,b)$ information, fog color $F_c(r,g,b)$ information and ambient light $A(r,g,b)$ intensity data, to find total color at point P as $$\begin{aligned} I_t = \ & P_c(r,g,b) * (1 - F_{og}) \times \Sigma Ill_p, \text{ clamped} \\ & + F_c(r,g,b) * F_{og} * A(r,g,b) \\ & + F_c(r,g,b) * \Sigma Ill_f, \text{ clamped}. \end{aligned}$$

Use of table look-up processes can also simplify other hitherto expensive computations in a CIG system, such as polygon surface shading in which reflected illumination reduction occurs responsive to the angle of incidence of the illumination on the surface 31 at point P. It is well-known that the shading function can be $F_{shd} = (\overline{L}_p - \overline{L}_s) \cdot \overline{N}_f / |\overline{L}_p - \overline{L}_s|$, where $\overline{N}_f$ is the unit normal to surface 31 at point P. This form of the shading function allows a backfacing test to be used to determine if the polygon faces away from the source and should not be illuminated. We have determined that the relatively expensive magnitude (i.e. absolute value) and divide operations are not necessary, if a look-up table (TLU) is used to provide correct shading function output, given an input based on $F'_{shd} = (\overline{L}_p - \overline{L}_s) \cdot \overline{N}_s$. Thus, the TLU stored data will gradually reduce the value of $F_{shd}$ output as the calculated $F'_{shd}$ approaches a zero value, so that reflected illumination intensity is zero when the surface polygon 31 backfaces the light source 30.

Figure 3A:
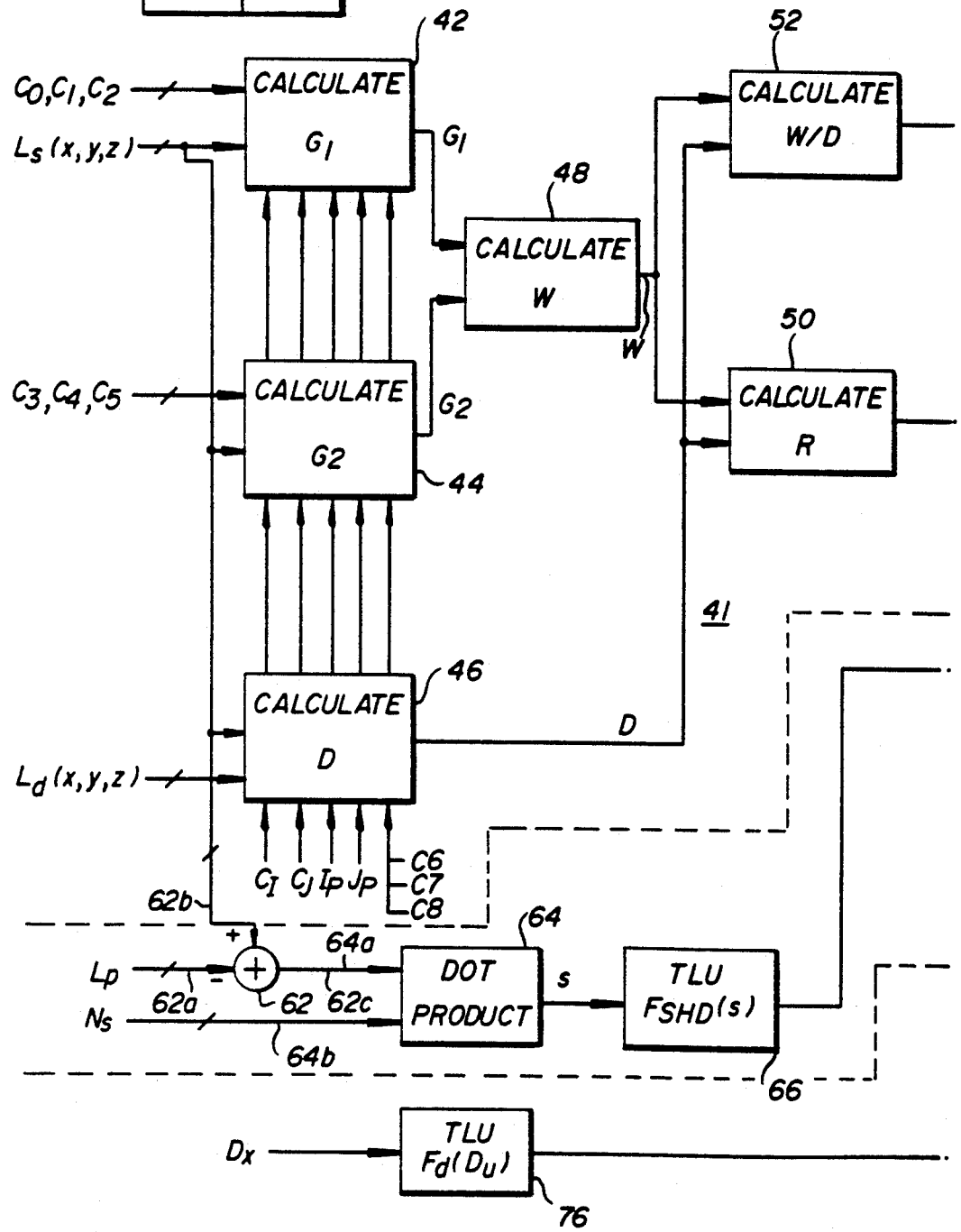
FIGS. 3a and 3b, is a schematic block diagram of one possible form of illumination subprocessor for use in a CIG system.
Figure 3B:
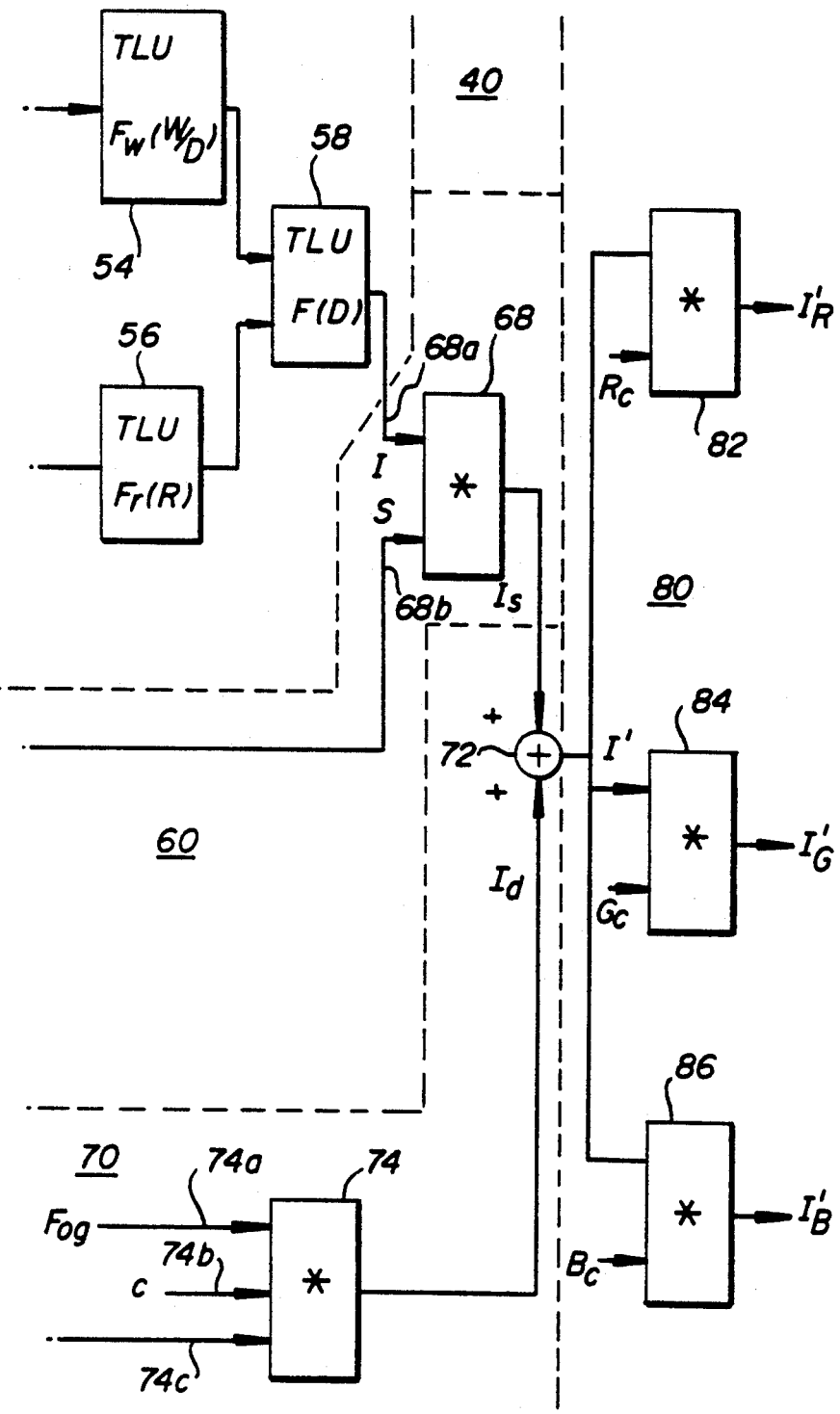

Referring now to FIG. 3, apparatus 40 provides the illumination intensity to be displayed at point 32p by use of the method employing the more exact calculations of equations (1)–(11), and is usually part of a larger portion of a display processor 16. Prior to subprocessor 40, it has been determined, by means well known to the CIG arts, that the particular light source in question will indeed illuminate a point P when that point is translated to be within the field-of-view of image screen 32, by consideration of the light source position and beam direction. In an initial step, the light gradient vectors $\overline{G}_1$ and $\overline{G}_2$ are calculated in gradient calculator means 42 and 44, respectively. Simultaneously, distance D is calculated in a third calculation means 46. All three calculation means 42/44/46 receive the Cartesian coordinates (u,v,w) of the light source vector $\overline{L}_s$, the image screen constants $C_v$ and $C_w$, the image screen point 32p coefficients $I_p$ and $J_p$ and the $P_u$ data. The normal-to-boresight plane length W is then calculated, from the first and second gradient $\overline{G}_1$ and $\overline{G}_2$ means 42 and 44 outputs, in a fourth calculation means 48, utilizing the equation $W = (|G_1|^2 + |G_2|^2)^{\frac{1}{2}}$. The calculated result at the output of means 48 is applied to a fifth calculation means 50 for calculating the distance R. A sixth calculation means 52 calculates the quotient W/D, unless a spherical source (or fog) is involved. The (w) data output from sixth calculation means 52 provides the address into a first table look-up means 54, in which is stored the function $F_w$ for a wide range of (W/D) values; means 52 and 54 are not used with spherical illuminators. Similarly, the output of fifth calculation means 50 provides the address data to a second table look-up means 56, which provides the function $F_r$ responsive to the particular value of the vector $\overline{R}$ addressing means 56. The $F_w$ and $F_r$ data output from respective TLU means 54 and 56 each are received by a multiplier means 58. A shading factor data means 60 provides $F_{shd}$ data for that polygon. In order to accommodate both polygon illumination and fog illumination, a set of multiplexers 62-1/62-2 and a demultiplexer 62-3, may be used. If fog signals are not present, the "0" terminals are coupled through the devices 62; if fog signals are being processed, the "1" terminals are through-coupled. The output of means 58 is the intensity value I of the source illumination incident upon point P, as translated to image screen 32, for the source then being considered.

If the image generator is operated in a mode allowing "fog"-type occultation of point P illumination, apparatus 40 may include a calculator means 64 to provide new U-axis data Pu', based upon the factors $C_4$, $C_5$ and $C_6$ for the source S and fog mass being considered. Here the "FOG" signal, indicative of a fog calculation being processed, switches the Pu' data to means 42/44/46, switches means 70 (instead of means 60) to multiplier 58, and causes means 62-3 to output the product to a fog data accumulator 78-1, instead of to a polygon data accumulator 78-2 which would otherwise store means 58 output data. Apparatus 40 may also include a portion 70 to calculate the fog illumination factor which multiplies the intensity. The fog factor Fo data is provided to another input of multiplier means 58, which also receives LOD data from means 73 and light color data from means 76. After all sources are processed, the total point P polygon illumination data $\Sigma Ill_p$ is stored in means 78-2 and is amplitude-clamped by means 80-2; the total point $P_{fog}$ illumination data $\Sigma Ill_f$ is stored in means 78-1 and is amplitude-clamped by means 70-1.

In the alternative, if the simplified models of FIGS. 2a–2c are used, the simplified illumination intensity apparatus of FIGS. 4a and 4b may be utilized to implement the associated method. The simplified spherical radiator computational means 90 (FIG. 4), has a table look-up TLU means 91, which receives luminosity extent $L_{ext}$ information and distance D information to provide an address for providing the $F_d(L_{ext}, D)$ information to a first input of a multiplication means 92, consecutively receiving the red, green and blue chroma luminosity $L_c(r,g,b)$ information at its other input; the three distance-attenuated chroma amplitudes are provided at a first output, while the spherical illumination direction normal vector $1_{\overline{Lsph}}$, is provided at the output of a subtraction means 94 which calculates the vector difference between source position vector $\overline{L}_s$ and surface position vector $\overline{L}_p$.

As shown in FIG. 4b, the beam/cylinder illumination amplitude and direction can be calculated in a simplified means 95 which utilizes the TLU means 91 and multiplier means 92 of FIG. 4b, as a portion of a total amplitude-calculating portion 96. A second TLU means 97 receives the beamwidth $\alpha$ angle data and the boresight offset angle $\beta$ information to look up the angle function $F_a(\alpha, \beta)$ for a second input to multiplier means 99; the amplitude of the beam/cylinder illumination function is provided at the output of multiplier 99, while the direction unit normal vector $1_{\overline{R}}$ is provided at the output of means 94.

It will now be apparent to those skilled in the art that a method, and corresponding apparatus, for calculating the illumination upon a surface polygon point P, translated to an image screen plane, has been provided. Several methods, and corresponding apparatus, for utilizing simplified models of various illumination sources, and their corresponding simplified apparatus, have also been presented, for use in image generation systems not requiring the greater precision of the initially-described method and apparatus; increased image generation speed and/or cost may thus be facilitated.

While several presently preferred embodiments of method and apparatus have been described in detail herein by way of example, many modifications and variations will not become apparent to those skilled in the art. It is our intent, therefore, to be limited only by the scope of the appending claims and not by the specific details and instrumentalities by way of explanation of the several preferred embodiments herein.

What we claim is:

1. A method for determining the total illumination of each pixel of a viewable display in an image volume controllable by a computerized image generator (CIG) system, comprising the steps of:
    (a) providing a scenic database memory means connected to a controller in the CIG system and an illumination source memory connected to a display processor in the CIG system;
    (b) storing in the scenic database memory means electronic data signals representing polygons approximating the faces of all potentially visible objects contained in an environmental area over which the CIG can select an image view for display;
    (c) separating each possible illuminator source into a set of at least one beam source, including at least one type of spherical beam source, divergent beam source and cylindrical beam source;
    (d) storing in the illumination source memory electronic data signals representing a pair of orthogonal gradient functions defining a beam lobe model of each of the beam sources forming each different one of the totality of possible illuminator sources capable of illuminating polygon faces within the image volume from which the CIG can select a display view;
    (e) selecting, responsive to control interface signals, from the electronic data signals representing the totality of illumination beam source lobe models stored in the illumination source memory, only the signals of those models for illuminator source lobes actually illuminating those object polygons then viewable from a present viewpoint which is also established by the same control interface signals;
    (f) determining, for each source lobe signal selected in step (e), a distance and direction of illuminator incidence of the light of that selected source lobe to the polygon face visible for each pixel in the image volume;
    (g) retrieving from the illumination source memory data the gradient function data signals for determining both the extent of illumination of each source lobe and the attenuation of illumination with respect to the determined distance for that selected illuminator source lobe;
    (h) then using the retrieved illumination lobe gradient function data signals, for the determined direction and the distance between each source location and the visible polygon, to generate a data signal representing a total illumination of that polygon face in the image volume visible for each displayable pixel, due to the light from the particular selected source;
    (i) then combining all of the illumination data signals acting upon each visible polygon from all selected sources to obtain a total face illumination data signal for an associated pixel in the image screen; and
    (j) displaying in each pixel of the viewable CIG image, responsive to the data signal obtained in step (i), the total face illumination for the polygon visible at that pixel.

2. The method of claim 1, wherein step (j) further comprises the step of displaying the illumination intensity of each different light color for each displayable pixel on the viewable screen surface.

3. The method of claim 1, wherein step (c) further includes the step of separating the lobe model illumination from each source into a set of different light colors; step (g) further includes the step of retrieving lobe gradient function data signal for each different light color for each selected source; and step (h) further includes the step of separately calculating from the lobe gradient function data signals the total polygon face illumination for each different light color.

4. The method of claim 3, wherein the different colors are red, blue and green.

5. The method of claim 1, wherein step (h) comprises the steps of: generating from the retrieved gradient function data signals a pair of orthogonal gradient vectors each also orthogonal to a beam boresight vector; calculating coefficients of the gradient vectors for a distance D between the selected source and a plane perpendicular to the boresight vector and also passing through the polygon at a point P associated with the pixel being displayed; and obtaining the attenuation between the source and the polygon point P by use of the calculated coefficients and distance D.

6. The method of claim 5, wherein the attenuation obtaining step includes the steps of: calculating a direct distance R between the source and point P; calculating a radial distance W between the selected point P and another point P' on the boresight vector at a distance D from the source; and then calculating attenuation as a function of distance R and (W/D).

7. The method of claim 1, wherein at least one of the sources selected in step (e) is a spherical beam source producing an essentially spherical illumination pattern, having a known location and a known attenuation-vs-distance function; and, for each selected spherical beam source, step (h) comprises the step of obtaining the polygon illumination data signal responsive to the product of at least a source luminance factor and a known function (F) of attenuation with respect to distance and based upon source extent and source-to-point distance.

8. The method of claim 7, wherein data signals characterizing the function (F) of attenuation-vs-distance are pre-stored in a look-up table which is accessed responsive to input of source-to-point P distance information to obtain the attenuation of the source light reaching point P.

9. The method of claim 1, wherein at least one of the sources selected in step (e) is a divergent beam source having a known location, a spread angle less than 180° and a known attenuation-vs-distance function; and, for each selected divergent beam source, step (h) comprises the step of obtaining the polygon illumination data signal responsive to the product of at least a source luminance factor, a known function (F) of attenuation with respect to distance and based upon source extent, source-to-point distance and an angular factor; the angular factor being a function of both (1) a source beam spread angle and (2) an offset angle between the beam boresight and a line directly between source and point P.

10. The method of claim 9, wherein data signals characterizing the function (F) of attenuation-vs-distance is pre-stored in a look-up table which is accessed responsive to input of at least one of spread angle and source-to-point P distance information to obtain the attenuation of the source light reaching point P.

11. The method of claim 9, wherein at least one of the sources selected in step (e) is a cylindrical source with a spread angle of substantially 0°; and, for each selected cylindrical beam source, the angular factor in step (h) uses only the offset angle.

12. The method of claim 11, wherein data signals characterizing the function (F) of attenuation-vs-distance is pre-stored in a look-up table which is accessed responsive to input of source-to-point P distance information to obtain the attenuation of the source light reaching point P.

13. The method of claim 1, wherein step (i) further comprises the step of shading the magnitude of the total illumination responsive to an angle between the direction of incidence of the illumination on each polygon and a normal $\overline{N}_f$ to the polygon surface at the point of illumination incidence.

14. The method of claim 13, further comprising the step of setting the shading to be equal to the translucency of the polygon, with an opaqueness translucency of zero and a transparency translucency of one, if a shading function $\overline{R} \cdot \overline{N}_f / |\overline{R}|$ value is not greater than zero.

15. The method of claim 1, wherein step (c) comprises using a substantially spherical source and a mass of illumination dispersant surrounding the source and present along a line-of-sight between an observer and point P.

16. The method of claim 15, wherein step (f) includes the steps of: generating a plane normal to a vector between an observer and source; and finding the direction of incidence to a point X in the normal plane and upon a line from the observer to the point P.

17. The method of claim 16, wherein data signals for a plurality of fog illumination conditions are stored, and step (g) includes the step of retrieving fog data signals for a selected condition.

18. The method of claim 15, wherein the dispersant is an atmospheric particle suspension of at least one selected one of fog, snow, ice, sand and smoke.

19. The method of claim 15, wherein the source illumination data signals is obtained responsive to a product of a factor determining illumination of a dispersant volume by a source, a dispersant density function and a factor inversely proportional to a distance between the observer location and a point X along the line-of-sight and perpendicular to a plane in which the source is located.

20. The method of claim 15, further comprising the step of setting a color for each pixel of the image screen surface by a combination of total illumination data signals from all polygon source, total illumination from all fog sources, fog color, polygon color and ambient light factors.

* * * * *